United States Patent

Shreesha

Patent Number: 5,798,516
Date of Patent: Aug. 25, 1998

[54] FOCUSING MECHANISM FOR HAND-HELD CCD SCANNERS

[75] Inventor: Vasanth Shreesha, Quakertown, Pa.

[73] Assignee: Accu-Sort Systems, Inc., Telford, Pa.

[21] Appl. No.: 654,189

[22] Filed: May 28, 1996

[51] Int. Cl.[6] .................................................. G06K 7/10
[52] U.S. Cl. .................................................... 235/472
[58] Field of Search .................................. 235/472, 462; 359/822, 823

[56] References Cited

U.S. PATENT DOCUMENTS

| | | | |
|---|---|---|---|
| 3,812,459 | 5/1974 | MacNeil et al. | 340/146.3 |
| 4,136,821 | 1/1979 | Sugiura et al. | 235/462 |
| 4,877,949 | 10/1989 | Danielson et al. | 235/462 |
| 5,001,509 | 3/1991 | Hamada et al. | 354/403 |
| 5,070,352 | 12/1991 | Kotani et al. | 354/402 |
| 5,192,856 | 3/1993 | Schaham | 235/462 |
| 5,281,801 | 1/1994 | Shepard et al. | 235/472 |
| 5,302,812 | 4/1994 | Li et al. | 235/462 |
| 5,308,964 | 5/1994 | Kwon | 235/472 |
| 5,308,966 | 5/1994 | Danielson et al. | 235/472 |
| 5,340,971 | 8/1994 | Rockstein et al. | 235/472 |
| 5,349,172 | 9/1994 | Roustaei | 235/472 |
| 5,359,185 | 10/1994 | Hanson | 235/472 |
| 5,378,883 | 1/1995 | Batterman et al. | 235/472 |
| 5,386,107 | 1/1995 | Dvorkis et al. | 235/472 |
| 5,397,885 | 3/1995 | Massieu et al. | 235/462 |
| 5,438,187 | 8/1995 | Reddersen et al. | 235/462 |

FOREIGN PATENT DOCUMENTS

| | | | |
|---|---|---|---|
| 0425844 | 5/1991 | European Pat. Off. | G06K 7/10 |
| 0548958 | 6/1993 | European Pat. Off. | G06K 7/10 |
| 0067692 | 3/1988 | Japan | 235/462 |
| 0027182 | 1/1990 | Japan | 235/462 |

*Primary Examiner*—Donald T. Hajeo
*Assistant Examiner*—Douglas X. Rodriguez
*Attorney, Agent, or Firm*—Volpe and Koenig, P.C.

[57] ABSTRACT

A hand-held scanning device employs apparatus for varying the depth of field of the scanning device. The scanning device comprises a gun-shaped housing for comfortably fitting within the hand of an operator. The scanning device is actuated by a finger-activated trigger, which moves a CCD sensor on an image plane as the trigger is pulled. In this manner, focusing for large depth of field applications is achieved.

20 Claims, 9 Drawing Sheets

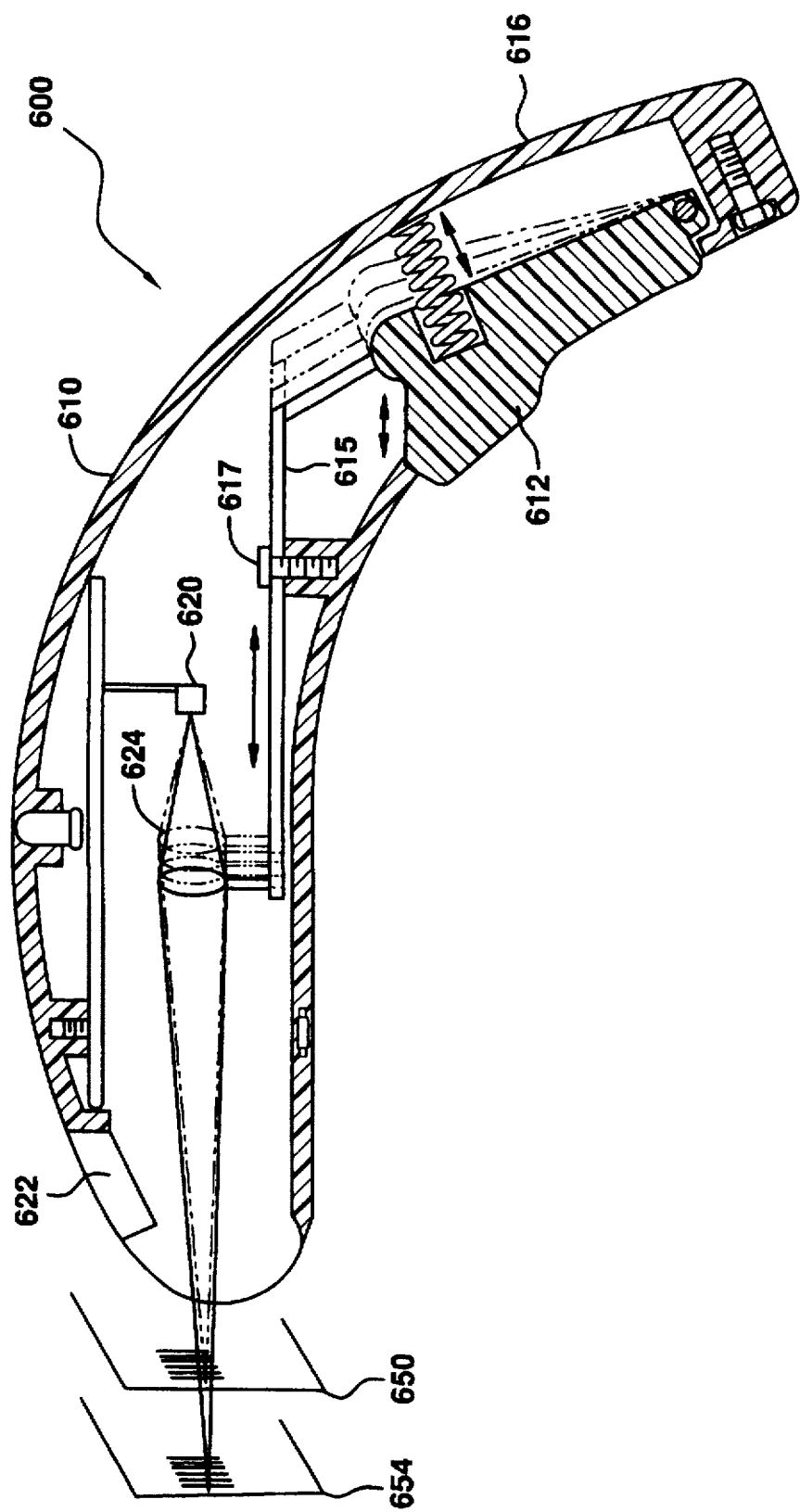

FOCUSING MECHANISM FOR HAND-HELD CCD SCANNERS

BACKGROUND OF THE INVENTION

1. Field of the Invention

This invention generally relates to scanners for reading optically coded symbols. More particularly, the invention relates to a hand-held CCD bar code scanner with an increased depth of field.

2. Description of Related Art

The reduced complexity and cost of bar code scanners has resulted in the proliferation of bar code scanners in retail and warehousing applications. Many retail stores and warehouses utilize hand-held bar code scanners at the point of sale to process items having coded symbol identifiers. Additionally, hand-held bar code scanners have been used increasingly for warehousing, document tracking and overnight courier applications.

Hand-held bar code scanners typically include a source of light, such as an array of light emitting diodes (LEDs), for bar code illumination and a detector, such as a charge coupled device (CCD), for detecting light reflected from the bar code. This class of bar code scanners is generally known as "CCD scanners." While laser scanners can be portable, CCD scanners have the advantages of not requiring the use of expensive and delicate lasers. However, there are still substantial limitations with current hand-held CCD scanners. A primary disadvantage is that a user is limited to scanning the bar code by either contacting the surface on which the bar code is imprinted or maintaining a limited distance away from the bar code. Thus, CCD scanners do not provide the comfort or versatility of laser scanners, which permit the scanning of bar code symbols at greater distances with a greater depth of field.

In present fixed CCD scanners, the CCD sensor is moved to achieve proper focusing based upon the height of an object relative to the fixed CCD scanner. This requires the use of a height sensor input, such as a light curtain. However, in hand-held applications both the CCD scanner and the object move with respect to each other. The bar code may be located anywhere in the depth of field and its distance from the scanner is unknown.

Attempts have been made to improve the performance of prior art CCD scanners by using flash illumination. However, CCD scanners still have very limited operating ranges and require proximity sensors to detect when the CCD scanner is within the operating range.

The result of these limitations on current CCD scanners is that bar codes are often unread, or require excessive amounts of time to align the scanner with the bar code for focusing. Thus, the benefits of marking items with machine-readable symbols are greatly diminished.

In order to increase the efficiency of hand-held bar code scanners and maintain the benefit of using machine-readable symbols, it is desirable to have a simple and inexpensive means for increasing the depth of field and accuracy of hand-held CCD scanners.

SUMMARY OF THE INVENTION

The present invention relates to a hand-held scanner for reading coded symbologies comprising means for illuminating a coded symbol during a scan, means for collecting illumination reflected from the coded symbol, collection means including a lens and a detector means which are in a variable spatial relationship relative to each other over a given depth of field range and means for varying the spatial relationship between the lens and detector means during a scan to establish multiple depths of field within the range.

Accordingly, it is an object of the invention to provide a CCD scanning device with an increased depth of field.

Other objects and advantages will become apparent to those skilled in the art after reading the detailed description of a presently preferred embodiment.

BRIEF DESCRIPTION OF DRAWINGS

FIG. 9 is a longitudinal sectional view of a third embodiment of the scanning device.

DETAILED DESCRIPTION OF THE PREFERRED EMBODIMENT

Figure 1:
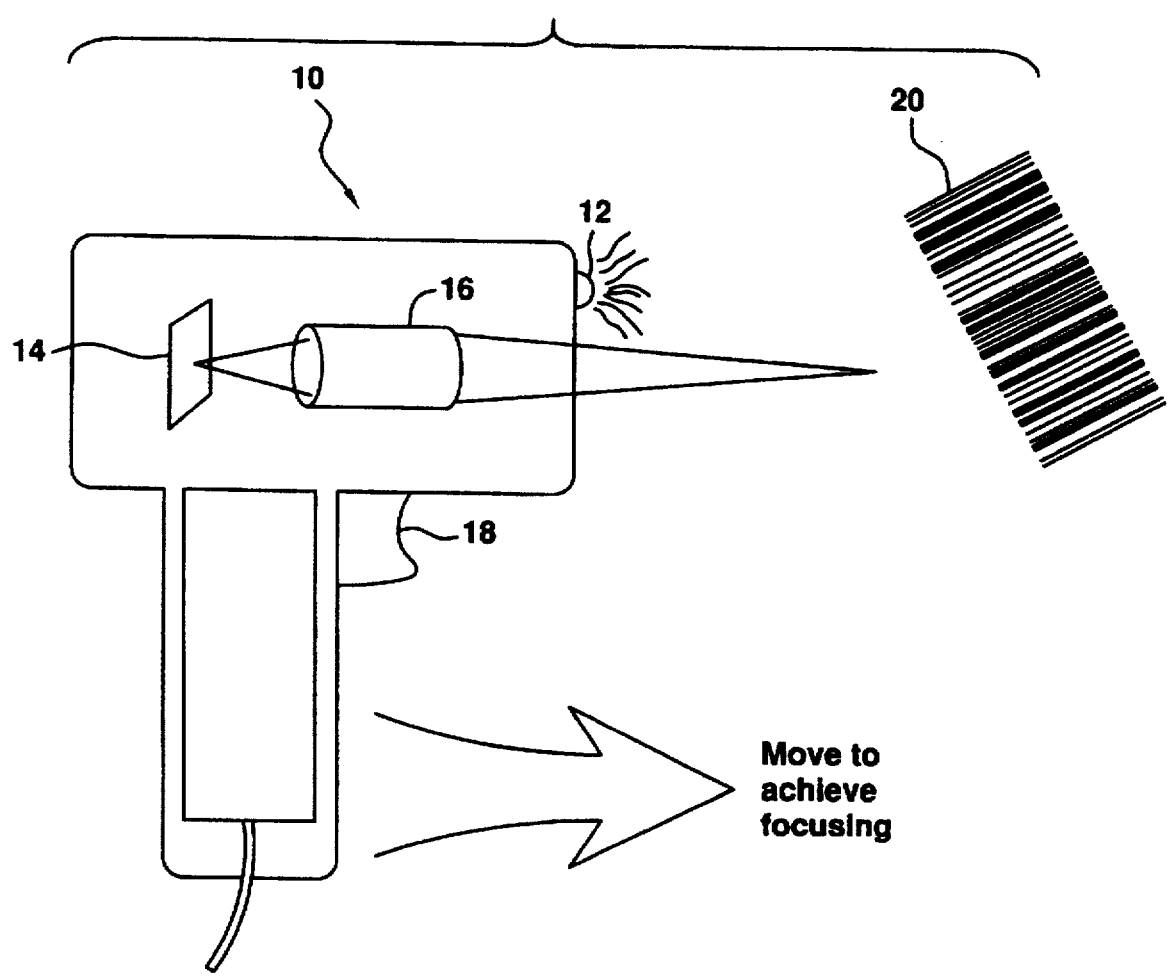
FIG. 1 is a prior art hand-held scanner.

The preferred embodiment will be described with reference to drawing figures where identical numerals represent similar elements throughout. Referring to FIG. 1, a prior art hand-held scanning device 10 is shown. The scanning device 10 includes a light source 12, a detector 14 and focusing optics 16. Since many hand-held scanning devices are held in the hand of an operator, they are generally gun-shaped to facilitate ease of use. In operation, a trigger 18 is depressed to energize the light source 12 and illuminate the subject bar code 20. Light reflected from the bar code 20 is focused by the focusing optics 16 onto the detector 14. The electronic image of the bar code 20 produced by the detector 14 is then forwarded to a microprocessor (not shown) for further processing. Since the focusing optics 16 are fixed relative to the detector 14, the operator must move the entire scanning device 10 until the bar code 20 comes into focus. This method of focusing is extremely cumbersome.

Figure 2:
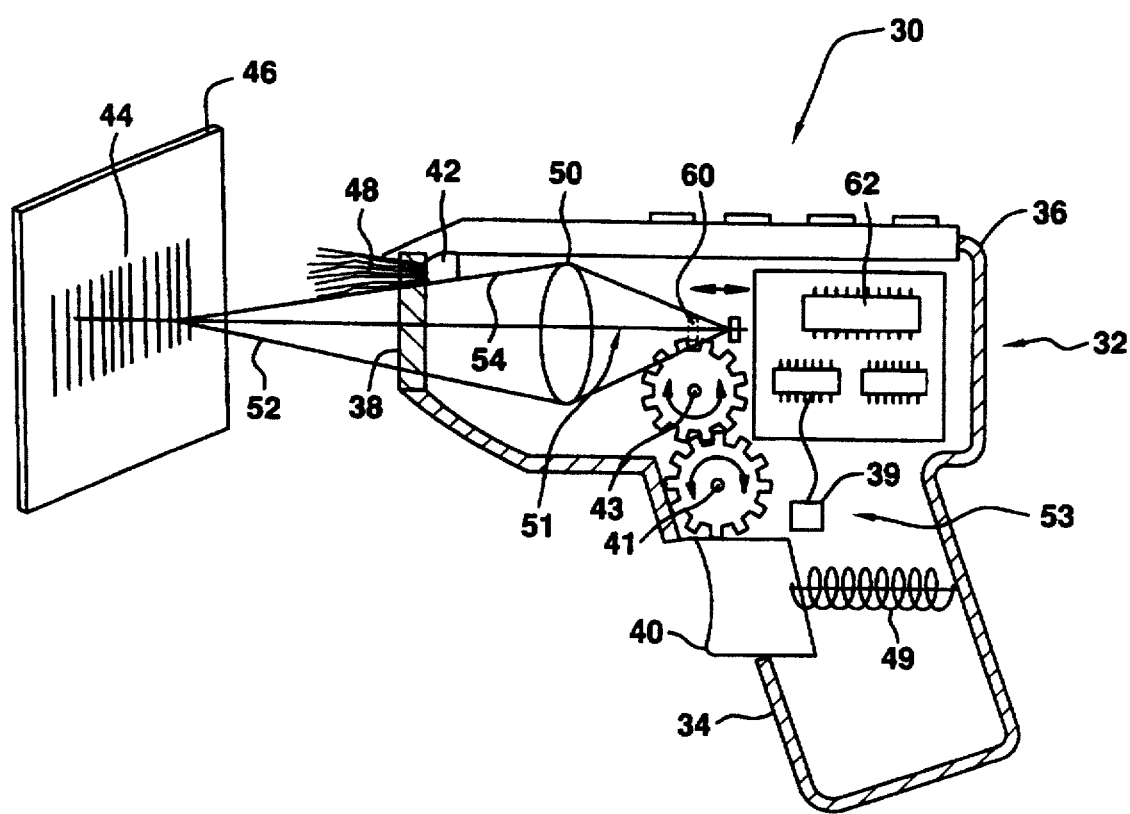
FIG. 2 is a longitudinal sectional view through a scanning device according to the present invention.

Referring to FIG. 2, a hand-held scanning device 30 made in accordance with the teachings of the present invention is shown. The scanning device 30 includes a generally gun-shaped housing 32 having a handle 34, a body portion 36, a window 38 and a manually actuated trigger 40. The handle 34 is contoured to comfortably fit within the hand of an operator. The operator grips the housing 32 by the handle 34 and aims the window 38 at the bar code symbol 44 to be read.

The trigger 40 is recessed within the handle 34 for easy one-handed operation of the scanning device 30. The trigger 40 is positioned relative to the operator's fingers such that activation of the scanning device 30 is achieved by squeezing one's fingers and depressing the trigger 40. The trigger 40 activates a light source 42, via a switch 39, to illuminate the bar code 44 located on a label 46. In the preferred embodiment, the light source 42 comprises a plurality of light emitting diodes (LEDs). However, it would be understood by those of skill in the art that other types of light sources may be utilized. For example, incandescent, fluorescent or other types of lights may be incorporated into the housing 32 or provided externally. In the preferred embodiment, the light source 42 is mounted within the front portion of the housing 32 such that the light 48 is projected outward from the housing 32 to the bar code 44.

A portion of the light that strikes the bar code 44 is reflected 52, 54 from the bar code 44, back through the window 38, to the focusing optics 50. The light is focused onto a detector 60, such as a photosensitive array, by the focusing optics 50. Preferably, the photosensitive array 60 is a charged coupled device (CCD). However, it would also be understood that other types of photosensitive detectors may be employed without departing from the spirit and scope of the present invention.

The light incident 52, 54 upon the detector 60 produces an electronic image of the bar code 44. The detector 60 then outputs the information to the signal processor 62 for further processing and decoding. The signal processor 62 is preferably mounted within the body portion 36 of the scanning device 30.

Figure 3:
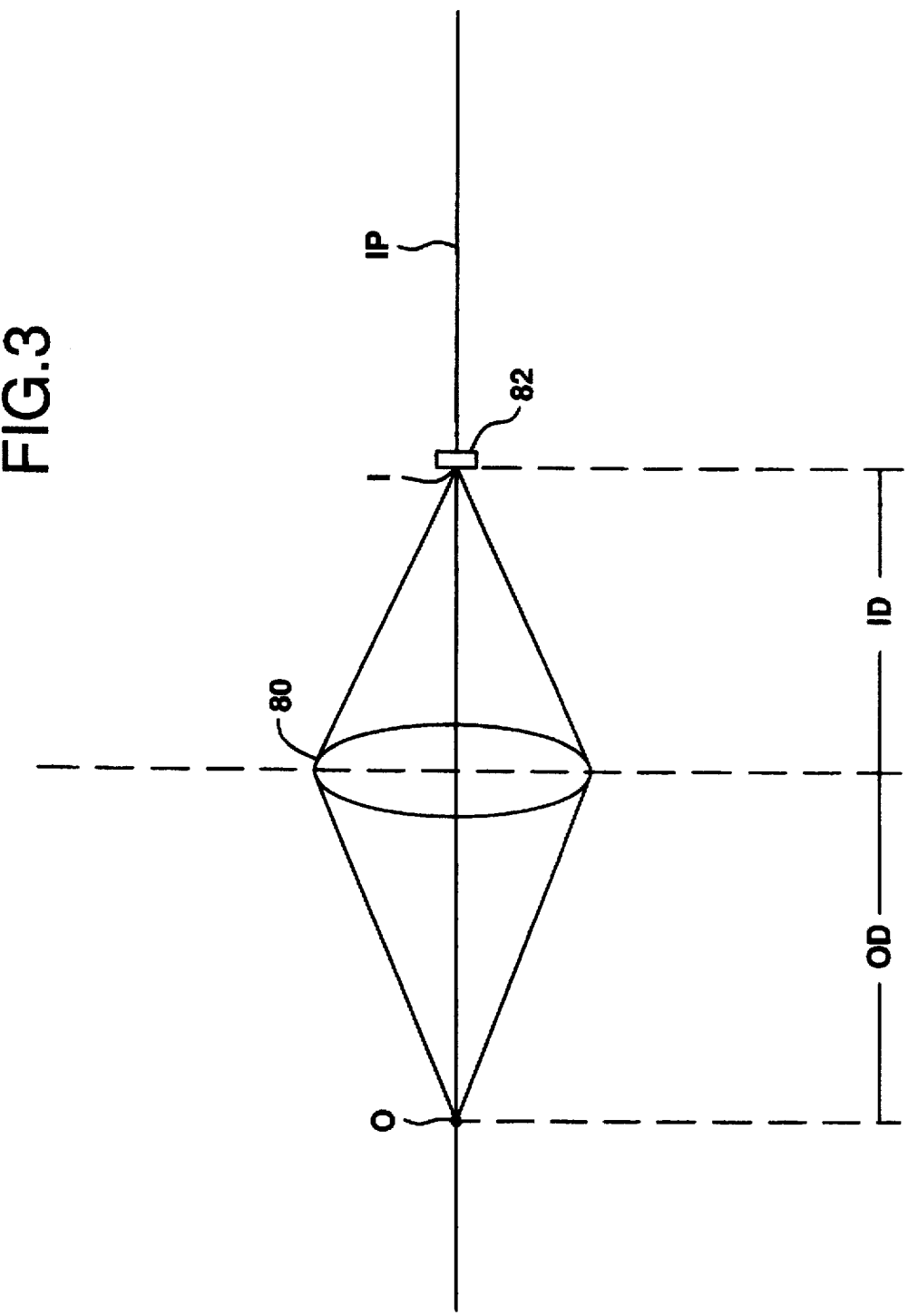
FIG. 3 is a basic optical layout.

Referring to FIG. 3, the optical arrangement of a typical scanning device can be defined by the thin lens formula:

$$\frac{1}{OD} + \frac{1}{ID} = \frac{1}{F} \qquad \text{Equation 1}$$

where F equals the focal length of the lens 80, ID equals the image distance and OD equals the object distance. Light reflected by the object O will be focused by the lens 80 to create an image I of the object O on the detector 82. An object O located at a distance OD from the lens 80 will create an image I on the detector 82 at a distance ID from the lens 80. If the detector 82 is stationary, the object O must be brought to the specific distance OD from the lens 80 to be properly focused. It is often cumbersome and frustrating for the operator to properly locate and focus the scanning device on an object O in this manner.

Figure 4:
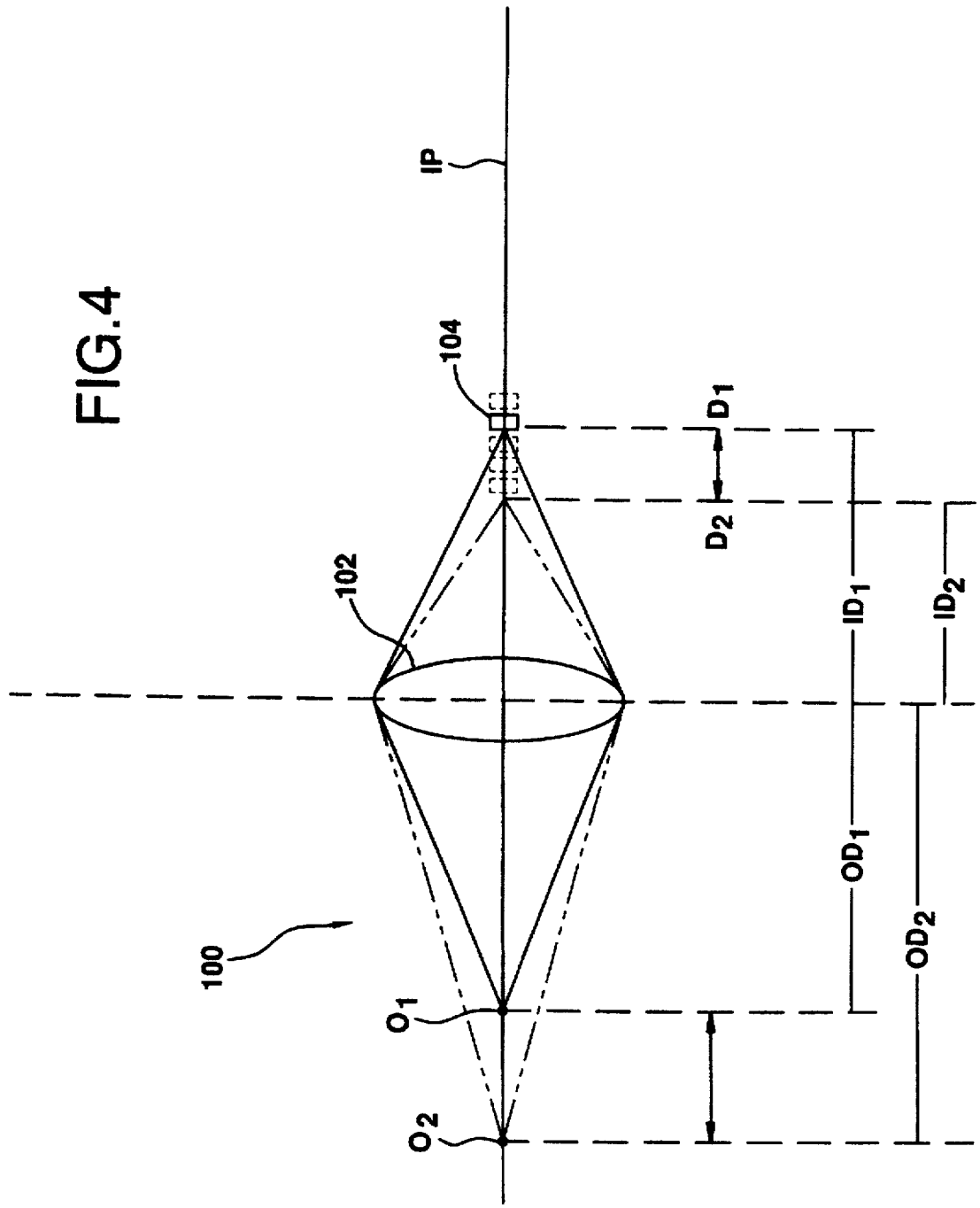
FIG. 4 is the optical layout of the scanning device of the present invention.

Referring to FIG. 4, the optical arrangement 100 of the preferred embodiment of the present invention is shown. In this arrangement 100, the optics 102 focus the reflected light onto a detector 104 which is moveable along the image path IP.

The further $O_2$ an object to be scanned is from the optics 102, the closer $D_2$ the detector 104 must be to the optics 102. The closer $O_1$ an object is to the optics 102, the further $D_1$ the detector 104 be from the optics 102. For a given focal length F, if the object distance varies between $OD_1$ and $OD_2$, then the image distance will vary between $ID_1$ and $ID_2$, where $OD_1$, $OD_2$, $ID_1$ and $ID_2$ are related by the thin lens formula:

$$\frac{1}{OD_1} + \frac{1}{ID_1} = \frac{1}{F}, \text{ and} \qquad \text{Equation 2}$$

$$\frac{1}{OD_2} + \frac{1}{ID_2} = \frac{1}{F}. \qquad \text{Equation 3}$$

If an object is placed between distance $OD_1$ and distance $OD_2$, the object may be brought into focus by sweeping the detector 104 from $ID_2$ to $ID_1$. Perfect focus is guaranteed at a minimum of one location along the trajectory on image path IP.

Figure 5:
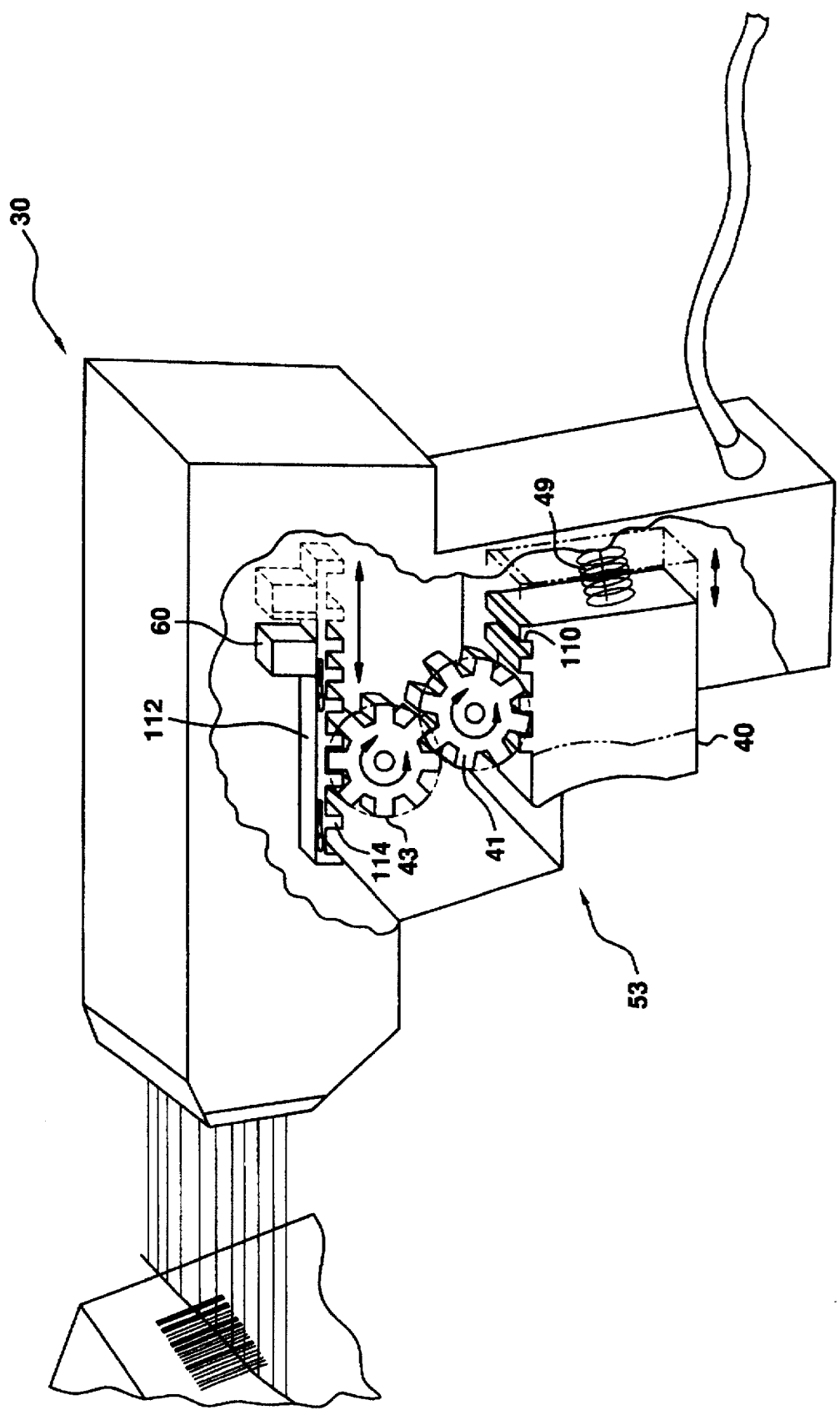
FIG. 5 is a cut-out perspective view of the trigger mechanism of the scanning device of the present invention.

Referring again to FIG. 2 the detector 60 is moved along the image path 51 using an actuator 53 which comprises trigger 40, and gears 41, 43. The actuator 53 is shown in greater detail in FIG. 5. The detector 60 is operatively associated with the trigger 40 by two gears 41 and 43. The top portion of the trigger 40 is provided with a plurality of crenellations 110. The crenellations 110 cooperate with the first gear 41, which drives the second gear 43. The second gear 43 further cooperates a plurality of crenellations 114 on a sliding platform 112. The detector 60 is attached to, and supported by, the sliding platform 112.

In operation, as the trigger 40 moves backward in response to pressure from the operator, the crenellations 110 intermesh with the teeth of the first gear 41, causing the first gear 41 to rotate. This, in turn causes the second gear 43 to rotate and move the sliding platform 112. The detector 60 moves backward in conjunction with the sliding platform 112. When the trigger 40 is released, a spring 49 biases the rear surface of the trigger 40, pushing the trigger 40 outward. Accordingly, the gears 41, 43 revolve in opposite directions, returning the detector 60 to its original position.

It should be understood by those skilled in the art that the actuator 53 in its most basic form has been described. However, it should also be understood that the actuator 53 may be altered without departing from the spirit and scope of the present invention. For example, a direct mechanical connection may be employed between the trigger 40 and the detector 60.

The detector 60 consists of an array of equally spaced pixels. The spacing of the pixels determines the limit of the resolution of the detector 60, so it is necessary to match the CCD resolution to the desired resolution of the scanning device 30. The magnification of the optics 50 should be chosen so at least two CCD pixels cover the minimum bar width to be resolved. This is particularly important for bar codes printed with a dot matrix printer. In operation, as the trigger 40 is pulled and the detector 60 is moved along the image path 51, the detector 60 repeatedly captures scans (in a linear camera) or frames (in an area camera). As would be appreciated by those of skill in the art, the required scanning rate of the detector will depend upon the speed of the movement of the trigger 40 and the light level. Since the scanning rate of the detector 60 will be orders of magnitude faster than the speed of movement of the trigger 40, the object will be in focus for at least a few scans.

If the object is farther than, for example, point $OD_2$ or closer than point $OD_1$, the detector 60 will be unable to focus and provide an accurate reading. In an alternate embodiment, a range detector may be provided to detect if the object is placed outside the range of the detector 60.

After the scans have been captured, the multiple scans are tested for validity and accuracy. To identify valid scanning candidates a high contrast test is performed. The contrast test determines the difference between the maximum and minimum gray scale values. The highest gray scale values indicate that the detector 60 is focused. Low gray scale values indicate that the detector 60 is improperly focused. Alternatively, a transition count test or other verification test may be performed, as is known in the art.

Figure 6:
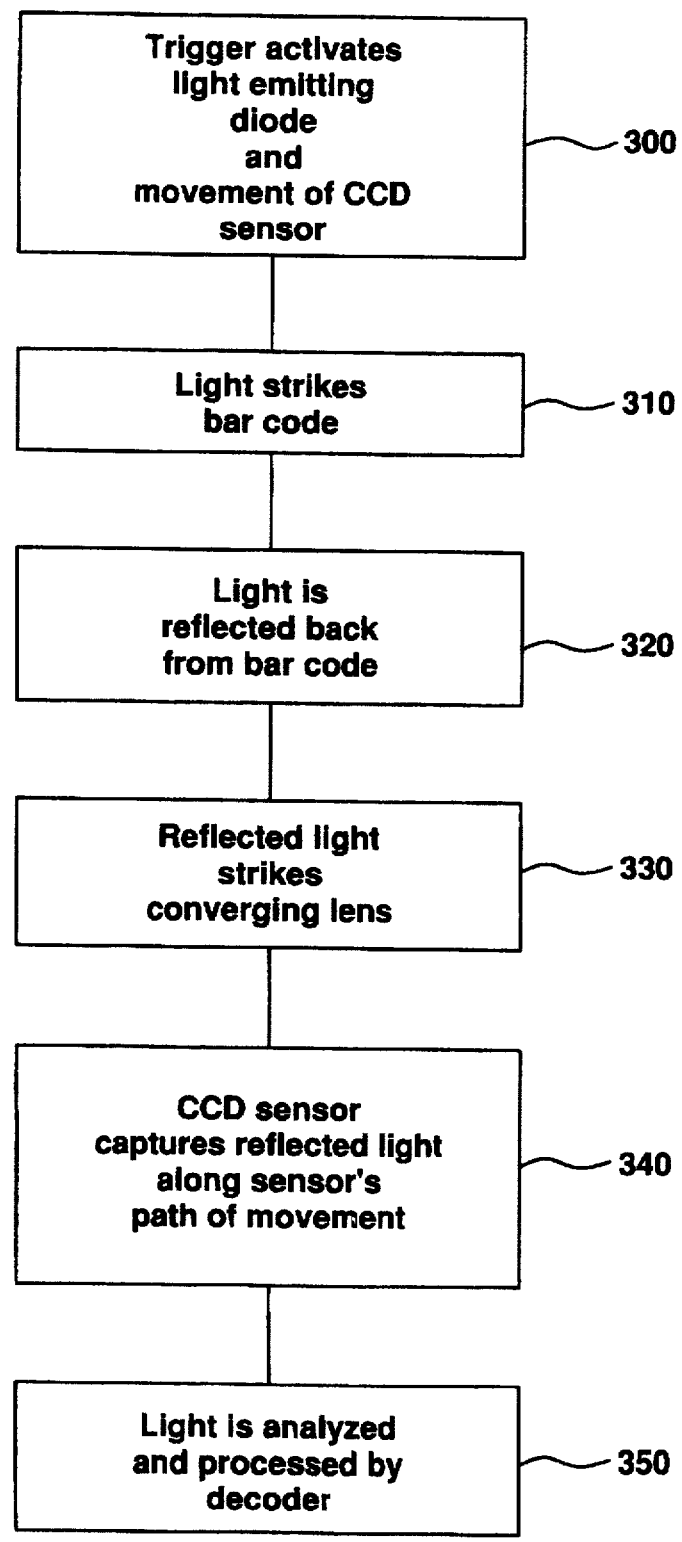
FIG. 6 is a block diagram of the operation of the scanning device of the present invention.

The operation of the scanning device 30 of the present invention may best be summarized with reference to FIG. 6. The operator squeezes the trigger 40 which activates the light source 42 and moves the CCD detector 60, (step 300). The light strikes the bar code 44, (step 310), and is then reflected back from the bar code 44, (step 320). The reflected light is converged by the optics, (step 330). The CCD detector 60 moves along the image path 51 and repetitively captures the reflected light at multiple points along the image path 51, (step 340). The detected image is then analyzed and processed, (step 350).

Figure 7:
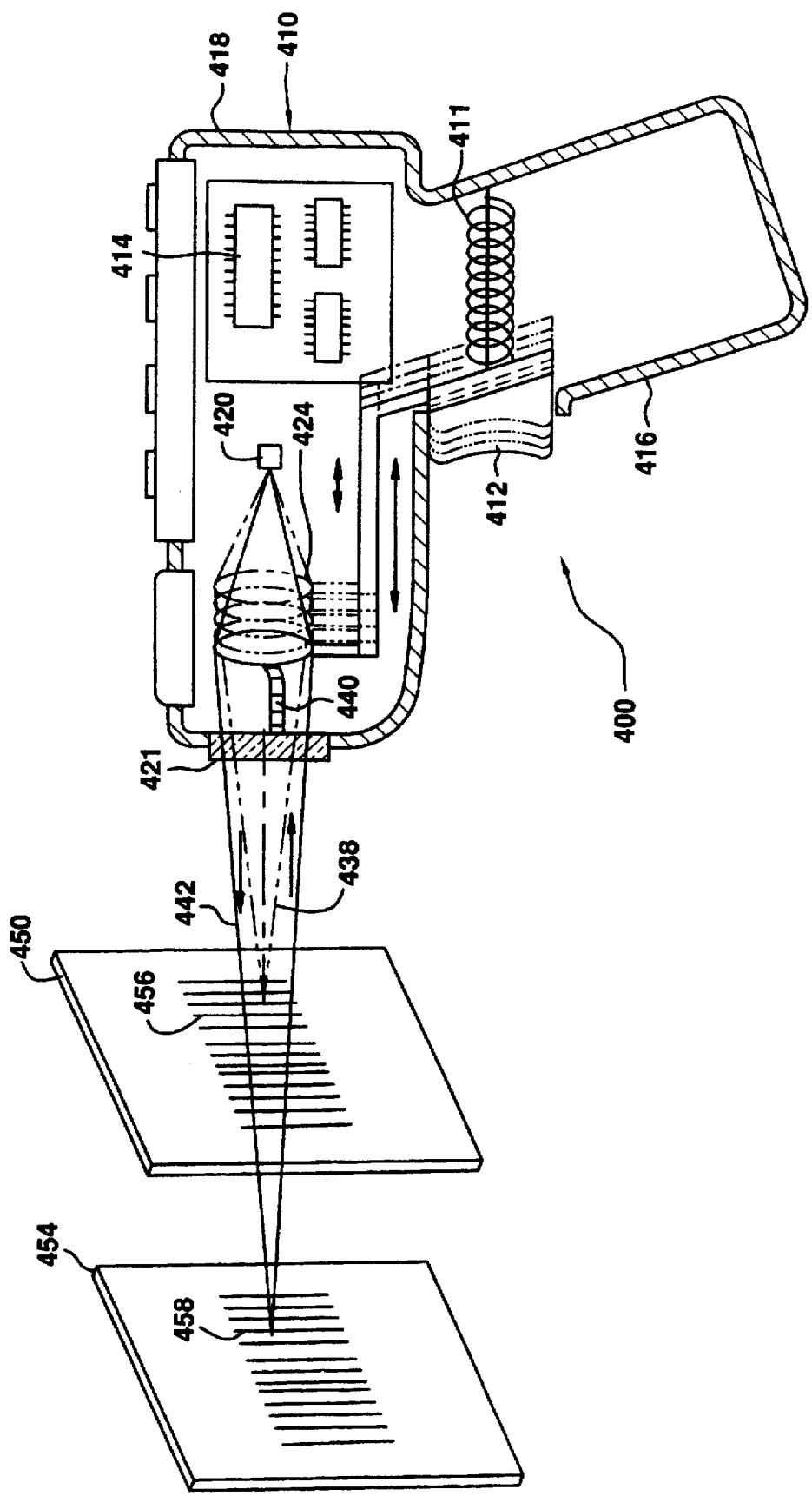
FIG. 7 is a longitudinal sectional view of a second embodiment of the scanning device.

An alternate embodiment of the present invention is shown in FIG. 7. The scanning device 400 includes a generally gun-shaped housing 410, a handle 416, a body portion 418, a detector 420, associated processing electronics 414, a return spring 411, a window 421 and a manually actuated trigger 412. Depressing the trigger 412 activates the scanning device 400 and energizes the light source 440. In this embodiment, however, the trigger 412 is operatively associated with the optics 424. The optics 424 move in response to the movement of the trigger 412, which sweeps the optics 424 along the image path.

Figure 8:
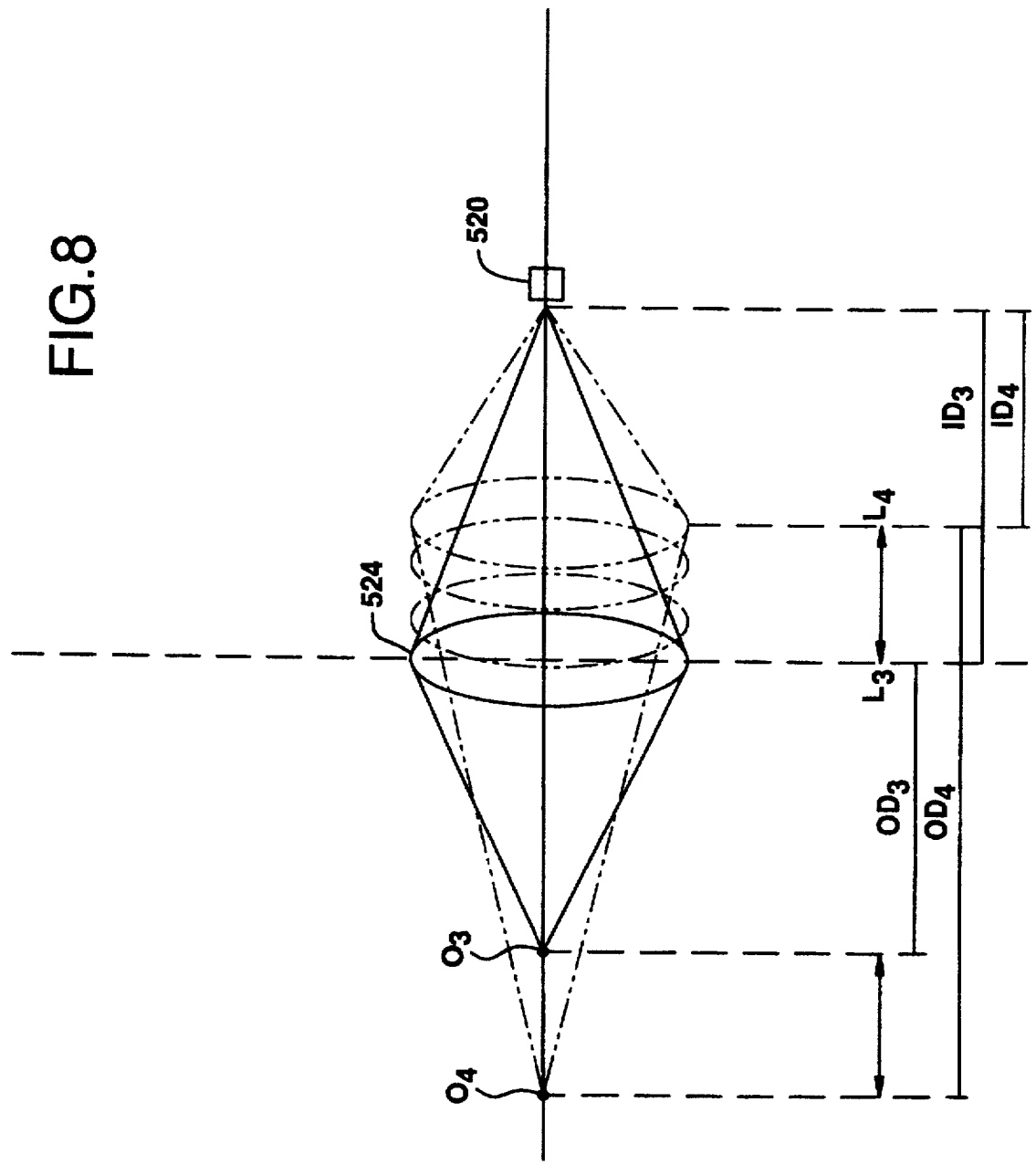
FIG. 8 is the optical layout of the second embodiment of the scanning device.

This embodiment operates in a similar manner to the embodiment shown in FIG. 2. Focusing of the reflected light 442, 438 from the bar codes 456 and 458 located at different distances 454, 450 is guaranteed through the range of movement of the converging lens 424. The relationship of the optical elements in the scanning device 400 can be described by Equation 1. Referring to FIG. 8, the object shown at points $O_3$ and $O_4$ can be focused on the image path IP by changing the distance between the lens 524 and the object $O_3$, $O_4$ shown by lines $OD_3$ and $OD_4$. The further the object is from the lens 524, the closer $L_4$ the lens 524 must be to the CCD detector 520. The closer the object is to the lens 524, the further $L_3$ the lens 524 must be from the CCD detector 520 as shown by line $ID_3$.

Sweeping the lens 524 along the image path IP guarantees focus at a minimum of one point along the path shown between points $L_1$ and $L_2$ of the lens 424. An object positioned at a distance of $OD_3$ will focus on the detector 520 at image distance $ID_3$. Varying the position of the lens 524 along the image path IP effectively varies the image distance between $ID_3$ and $ID_4$. An object positioned at distance $OD_4$ will focus on the detector 520 at image distance $ID_4$.

It should be understood by those of skill in the art that the shape of the housing may be substantially changed without departing from the spirit and scope of the invention. For example, a second alternate embodiment of the present invention is shown in FIG. 9 with an ergonomically shaped housing 610. Although the housing is substantially different in appearance, it functions identically to the aforementioned embodiments. The scanning device 600 includes an ergonomically designed housing 610, a handle portion 616, and a manually actuated trigger 612. Similar to the above described embodiments, depressing the trigger 612 activates the scanning device 600 and energizes the light source 622. The trigger 612 is operatively associated with the optics 624 via a linkage 615 that moves the optics 624 in response to the trigger 612 movement. The movement of the optics 624 then refocuses bar codes 654, 650 at different distances onto a detector 620.

While the present invention has been described in terms of the preferred embodiment, other variations which are within the scope of the invention as defined in the claims will be apparent to those skilled in the art.

I claim:

1. A hand-held scanner for reading coded symbologies comprising:
   means for illuminating a coded symbology during scanning;
   means for collecting illumination reflected from the coded symbology, the collection means including a lens and a detector means which are positioned in a variable spatial relationship relative to each other; and
   means for varying the spatial relationship between the lens and detector means during the scanning to establish multiple depths of field,
   said varying means including trigger means constructed and arranged so as to be manually squeezed and depressed, and
   means mechanically linking said trigger means to said lens or detector means, whereby movement of the trigger is translated to said lens or detector means so as to vary said spatial relationship in response to said trigger means being manually squeezed and depressed.

2. The scanner of claim 1 wherein the means for varying the spatial relationship between the lens and detector means moves the detector means relative to the position of the lens.

3. The scanner of claim 1 wherein the means for varying the spatial relationship between the lens and detector means moves the lens relative to the position of the detector means.

4. The scanner of claim 1 wherein the means for varying the spatial relationship between the lens and detector means also controls the means for illuminating the coded symbol.

5. The scanner of claim 1 wherein the means for varying the spatial relationship between the lens and detector means is controlled by a trigger.

6. The scanner of claim 5 wherein the trigger also controls the means for illuminating the coded symbol.

7. The scanner of claim 5 wherein the trigger moves the detector means relative to the position of the lens.

8. The scanner of claim 5 wherein the trigger moves the lens relative to the position of the detector means.

9. The scanner of claim 6 wherein the trigger moves the detector means relative to the position of the lens.

10. The scanner of claim 6 wherein the trigger moves the lens relative to the position of the detector means.

11. The scanner of claim 1 further including means for returning said lens and detector means to their original spatial relationship upon said trigger means being released from being squeezed and depressed.

12. The scanner of claim 11 wherein said returning means includes a spring which urges said trigger means against being squeezed and depressed.

13. A method for reading coded symbologies with a hand-held scanner comprising:
   providing a means for illuminating a coded symbology during scanning;
   providing a means for collecting illumination reflected from the coded symbology, the collection means including a lens and a detector means which are positioned in a variable spatial relationship relative to each other; and
   providing a means for varying the spatial relationship between the lens and detector means during the scanning to establish multiple depths of field, said means for varying said spatial relationships including trigger means,
   said trigger means being operatively associated with the lens or the detector means by intermeshing gear means.

14. The method of claim 13 wherein the means for varying the spatial relationship between the lens and detector means moves the detector means relative to the position of the lens.

15. The method of claim 13 wherein the means for varying the spatial relationship between the lens and detector means moves the lens relative to the position of the detector means.

16. The method of claim 13 wherein the means for varying the spatial relationship between the lens and detector means also controls the means for illuminating the coded symbol.

17. A hand-held scanner for reading coded symbologies comprising:
   means for illuminating a coded symbology during a scan;
   means for collecting illumination reflected from the coded symbology, said collecting means including a lens and a detector means which are in a variable spatial relationship relative to each other; and means for varying the spatial relationship between the lens and detector means during the scan to establish multiple depths of field, the means for varying the spatial relationship including trigger means, the trigger means moving the detector means relative to the position of the lens along an image path, and the trigger means being operatively associated with the detector means by intermeshing gear means.

18. A hand-held scanner for reading coded symbologies comprising:

means for illuminating a coded symbology during a scan;

means for collecting illumination reflected from the coded symbology, said collecting means including a lens and a detector means which are in a variable spatial relationship relative to each other; and means for varying the spatial relationship between the lens and the detector means during the scan to establish multiple depths of field, the means for varying the spatial relationship including trigger means, the trigger means moving the lens relative to the position of the detector means along an image path, and the trigger means being operatively associated with the lens by intermeshing gear means.

19. A hand-held scanner for reading coded symbologies comprising;

means for illuminating a coded symbology during a scan;

means for collecting illumination reflected from the coded symbology, said collecting means including a lens and a detector means which are in a variable spatial relationship relative to each other; and means for varying the spatial relationship between the lens and detector means during the scan to establish multiple depths of field, the means for varying the spatial relationship including trigger means, the trigger means also controlling the means for illuminating the coded symbology, the trigger means moving the detector means relative to the position of the lens along an image path, and the trigger means being operatively associated with the detector means by intermeshing gear means.

20. A hand-held scanner for reading coded symbologies comprising;

means for illuminating a coded symbology during a scan;

means for collecting illumination reflected from the coded symbology, said collecting means including a lens and a detector means which are in a variable spatial relationship relative to each other; and means for varying the spatial relationship between the lens and detector means during the scan to establish multiple depths of field, the means for varying the spatial relationship including trigger means, the trigger means also controlling the means for illuminating the coded symbology, the trigger means moving the lens relative to the position of the detector means along an image path, and the trigger means being operatively associated with the lens by intermeshing gear means.

* * * * *